United States Patent [19]
McNish

[11] 3,932,161

[45] *Jan. 13, 1976

[54] FIBROUS INSULATING MATERIALS

[76] Inventor: Thomas Gordon McNish, "Silverton", 27 Silver St., Buckden, Huntingdonshire, England

[ * ] Notice: The portion of the term of this patent subsequent to Mar. 14, 1989, has been disclaimed.

[22] Filed: Apr. 9, 1973

[21] Appl. No.: 349,448

Related U.S. Application Data

[63] Continuation of Ser. No. 95,374, Dec. 4, 1970, abandoned.

[52] U.S. Cl. .................. 65/3; 65/4; 156/62.2; 156/296; 264/60; 264/62; 264/90; 427/224; 427/372
[51] Int. Cl.² ........................................ C03C 27/00
[58] Field of Search....... 117/46 CA, 46 FA, 46 FC, 117/62, 126 AF, 126 GF, 140 R, 169 A; 156/62.2, 62.4, 296; 264/60, 62, 90, 43; 161/170; 427/224, 372; 65/4, 3

[56] References Cited
UNITED STATES PATENTS

| | | | |
|---|---|---|---|
| 128,980 | 7/1872 | Rowland | 117/106 |
| 1,765,312 | 6/1930 | Steffens | 117/169 A |
| 2,046,494 | 7/1936 | Rollegheim | 117/169 A |
| 2,273,859 | 2/1942 | Gould | 264/90 |
| 2,785,455 | 3/1957 | McElroy | 264/90 |
| 2,799,693 | 7/1957 | Dodgson | 117/126 |
| 2,802,749 | 8/1957 | West et al. | 106/69 |
| 2,886,466 | 5/1959 | Iler et al. | 117/169 R |
| 3,083,111 | 3/1963 | Nickerson | 106/56 |
| 3,144,376 | 8/1964 | Plumberg et al. | 156/62.4 |
| 3,259,516 | 7/1966 | Dempsey et al. | 117/46 FC |
| 3,377,225 | 4/1968 | Munters | 117/126 |
| 3,452,804 | 7/1969 | Mellen et al. | 164/26 |
| 3,480,125 | 11/1969 | Ash | 264/30 |
| 3,499,788 | 3/1970 | Glav | 117/126 |
| 3,507,944 | 4/1970 | Moore | 264/109 |
| 3,516,847 | 6/1970 | Schuster et al. | 117/46 FC |
| 3,528,791 | 9/1970 | Giffen | 264/90 |
| 3,591,407 | 7/1971 | Petersik et al. | 117/46 FC |
| 3,608,143 | 9/1971 | Schutz | 264/90 |
| 3,649,406 | 3/1972 | McNish | 156/245 |

*Primary Examiner*—William D. Martin
*Assistant Examiner*—Janyce A. Bell
*Attorney, Agent, or Firm*—Hall & Houghton

[57] ABSTRACT

Heat-insulating ceramic pieces are made, suitable for assembly to form the internal linings of gas turbine engine ducts, by producing and shaping an adherent mass of short fibre ceramic filaments and silica sol. After the shaped pieces have been dried, the surface of each is coated with fresh silica sol and the coated surfaces subjected to high intensity heating by means of an impinging flame which forms a very hard erosion-resistant skin on each piece.

2 Claims, No Drawings

FIBROUS INSULATING MATERIALS

This is a continuation of application Ser. No. 95,374, filed Dec. 4, 1970, now abandoned.

This invention relates to fibrous insulating materials used for heat or sound insulation purposes and, in the case of heat insulation, particularly in connection with equipment or apparatus in which very high temperatures are encountered.

One object of the invention is to provide insulating material which can be manufactured in a simple manner, lending itself to large scale production and affording a high degree of insulation in addition to being capable of a wide range of uses.

According to the present invention a method of producing an insulating material comprises the steps of treating a mass of fibrous filaments to the action of a binding agent, coating the surface of the mass with a material which, when subjected to heat, produces a hard skin on said mass and treating said coating to heat of the requisite intensity to result in the production of a hard skin.

In a particular method of carrying out the invention the binding agent used is a silica sol, the surface of the treated mass is coated with silica sol and the coating is subjected to heat at flame temperature.

Preferably, in carrying out the invention, a propane flame is applied to that part of the surface of the fibrous material at which it is desired to produce the hard skin. The material may be pre-formed to assume any desired shape.

A method of producing insulating material embodying the invention will now be described in greater detail by way of example.

Ceramic fibrous material consisting of a mass of filaments produced from china clay has good heat insulating qualities but for most heat insulating purposes requires some form of mechanical support or binding in order to maintain it as a handleable coherent mass. The material itself cannot be used as a heat insulating lining on, for example, the interior wall of a gas turbine and must be encased in a relatively rigid covering.

It has already been proposed to stabilise the filaments mechanically by treating them with a binding or stiffening agent.

In one method of carrying out the present invention a quantity of china clay filaments is chopped into short lengths of the order of one eighth of an inch, care being taken to avoid reducing the filaments to powder. The chopped up filaments are treated with a silica sol, such as that known under the trade name "SYTON X30 and it is desirable to ensure, as far as possible, that the individual filaments become coated with the silica sol. Accordingly, the chopped filaments should be fluffed up to loosen the mass and if the chopping apparatus used is such that the mass of filaments is insufficiently loose, then the mass is fluffed up so that the volume it occupies is increased to say about 10 times the volume occupied by the chopped filaments prior to being fluffed up. The mass of treated filaments is then lightly squeezed to remove excess silica sol and applied by flocking onto a support which may be a mould or a metal surface which it is desired to provide with insulation. If it is desired that the mass shall permanently adhere to the surface to which it is applied, that surface should preferably be roughened. After any necessary spreading or shaping of the deposited mass of treated filaments, hot air at a temperature of about 140°F is passed over the surface of the mass to effect drying. As drying proceeds, the mass of treated filaments tends to stick to the supporting surface and the drying process results in some degree of stiffening of the mass and hardening of the outer surface of the mass sufficient to permit rubbing down to conform to a desired shape. The exterior surface of the mass has then applied to it by, for example, brushing, undiluted silica sol and the surface is then dried fairly quickly in a stream of hot air. If necessary, additional coats of the silica sol, say three coats in all, are then similarly applied and dried, the treated surface finally presenting a shiny appearance. The final coating produced consists almost wholly of silica sol but exhibiting the presence of ends of filaments of china clay. A torch flame from a propane gas bottle is then applied over the surface of the material until it glows pink. The heat treatment is maintained for about one minute or longer if necessary and results in the production of a very hard skin due to combination of the silica sol and the filaments. The thickness of the skin so produced will depend on the flame temperature and duration of treatment of the surface. Preferably the flame treatment is continued until a skin thickness of one sixteenth of an inch is produced.

The fibrous material may be pre-formed to any desired shape depending on the purpose to which it is to be put. For example, the process known as vacuum forming may be used to produce desired shapes from filaments in a suspension and surfaces of the shapes so produced are subsequently subjected to the flame treatment.

The hard surface skin provides additional heat protection to that provided by the fibrous material.

Although reference has been made to silica sol as a binding or stiffening agent, other materials, providing they serve the desired purpose, may be used. For example, ceramic cement known under the trade name "FIXWOOL" may be employed. Again, while reference has been made to the use of a propane flame torch, any appropriate heat source may be used providing it is capable of producing the requisite heating temperature at the surface of the material. That temperature should be of the order of 1000°F.

The invention is applicable to fibrous materials other than those composed of filaments of china clay, for example, quartz, mineral fibres or mixtures of such fibres or filaments. Again, although reference has been made to a particular fibrous material composed of a mass of filaments, the invention is applicable to woven fibres.

It will be apparent that a heat insulating material made in accordance with the invention is capable of a very wide range of uses including, for example, furnace linings, gas generating and circulating plants and heat exchangers.

Although emphasis has been laid on the use of fibrous material made in accordance with the invention for heat insulating purposes, the material is very effective as a sound insulator with especially advantageous application for silencing purposes in aircraft, motor car or lorry engines. The hard skin produced as described resists erosion under conditions of high rates of gas flow.

The insulating material described may be formed into any desired shape depending on the contours of the surfaces to be insulated. Where only a simple shape of product is required it may be completely formed on the article to be insulated but final products of complex shape are preferably built up from several simpler shapes secured together by an adhesive such as a high temperature resistant glue. When building up an insulator in the duct of a gas turbine, for example, separately made parts are assembled with their abutting faces angled at 45°, the adhesive being applied to these faces. The inclined abutting faces are so disposed in the duct that they are inclined rearwardly with respect to the direction of flow of the hot gases and the insulator compound of the assembled parts may be secured in position by glue applied to its outer surface which contacts the wall of the duct. Instead of, or in addition to, a cementing medium such as high temperature resistant glue, the separate parts used to build up a complex shape may be formed with co-operating keying projections or recesses.

I claim:

1. A method of producing an insulating body consisting of an outer hard skin covering a mass of short bound fibrous filaments which are adhered together by a binding agent and is suitable for use as the internal lining of gas turbine engine ducts, which comprises contacting a mass of short fibrous ceramic filaments with silica sol in an amount sufficient to cause the filaments to adhere to one another to form an adherent fibrous mass, shaping the adherent mass into a predetermined form, drying the shaped mass, applying a coating of silica sol to the surface of the dried shaped fibrous mass and thereafter flame heating said applied coating at a temperature and for a period of time sufficient to form a hard, highly erosion-resistant skin on the surface of said fibrous mass to thereby form the desired insulating body.

2. A method in accordance with claim 1 wherein said ceramic filaments are China clay filaments and the drying of the adherent fibrous mass is achieved by application of a stream of hot air thereto.

* * * * *